Figure 1:
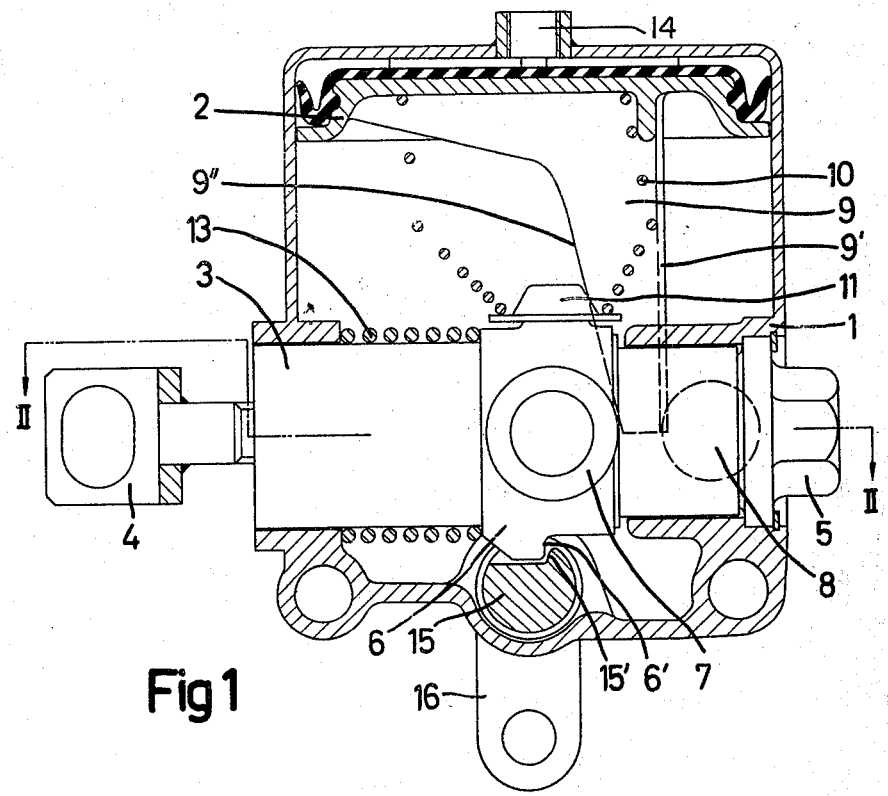

United States Patent [19]

Severinsson

[11] 3,995,537
[45] Dec. 7, 1976

[54] FLUID PRESSURE ACTUATED BRAKE UNIT

[75] Inventor: Lars Mattis Severinsson, Hishult, Sweden

[73] Assignee: Svenska Aktiebolaget Bromsregulator, Malmo, Sweden

[22] Filed: Mar. 19, 1975

[21] Appl. No.: 559,986

[30] Foreign Application Priority Data

Mar. 28, 1974 Sweden .................. 7404170

[52] U.S. Cl. .............. 92/129; 92/130 R; 74/110; 188/106 F
[51] Int. Cl.² .............. F16J 1/10; F01B 31/00
[58] Field of Search .............. 92/101, 129, 130 R; 91/382; 74/110; 188/106 F

[56] References Cited

UNITED STATES PATENTS

| 1,799,229 | 4/1931 | Hanna ........................ 74/110 |
| 2,865,212 | 12/1958 | Fischer et al. .............. 74/110 |
| 2,962,074 | 11/1960 | Dupre et al. ................ 74/110 |
| 3,535,944 | 10/1970 | Newstead .................... 74/110 |
| 3,663,115 | 5/1972 | Vindez ....................... 74/110 |
| R27,257 | 12/1971 | Cox et al. ................... 74/110 |

FOREIGN PATENTS OR APPLICATIONS 1,680,381  7/1971  Germany

*Primary Examiner*—Paul E. Maslousky
*Attorney, Agent, or Firm*—Laurence R. Brown

[57] ABSTRACT

A fluid pressure brake unit with a fluid piston actuated wedge that moves a brake push rod in a direction perpendicular to the piston stroke has provided therein a forked wedge astraddle the push rod that engages on opposed wedge surfaces respectively two rollers placed on opposite sides of the push rod and two rollers affixed to the brake unit housing. For hand brake use, a rotatable member has a cam head engaging the push rod assembly to move it independently of the wedge action.

6 Claims, 3 Drawing Figures

FLUID PRESSURE ACTUATED BRAKE UNIT

This invention relates to a fluid pressure actuated brake unit, including a piston axially movable in a cylinder, a push rod axially movable substantially perpendicular to the axial direction of the piston and intended for connection to further parts of a vehicle brake system, and a fork-shaped wedge element attached to the piston and placed astraddle of the push rod for force-transmission from the piston to the push rod, each leg of the wedge element having a reaction surface in the axial direction of the piston and a working surface inclined in relation thereto.

Such brake units are known, for example through the German Patent Publication No. 1,680,381. In the design shown therein a working surface parallel to each wedge working surface is arranged on the push rod, and a reaction surface parallel to each wedge reaction surface is arranged in the house of the unit. Between the coacting parallel surfaces there are roller elements. Besides the face that the surfaces on the push rod and in the house of the unit has to be accurately machined, it is difficult to maintain the roller elements in proper positions between the surfaces, and in fact no solution to this problem is presented. This design is also comparatively voluminous, as the said surfaces on the push rod and in the house of the unit must be of a length corresponding to half the length of the wedge surfaces.

The object of the present invention is to obviate the mentioned disadvantages with the known brake unit and to accomplish an improved and less voluminous brake unit of the kind described.

This is according to the invention attained in that the brake unit is characterised by a working roller on each side of the push rod for cooperation with the working surface and by a reaction roller in the house of the unit for cooperation with each of the reaction surfaces.

Figure 2:
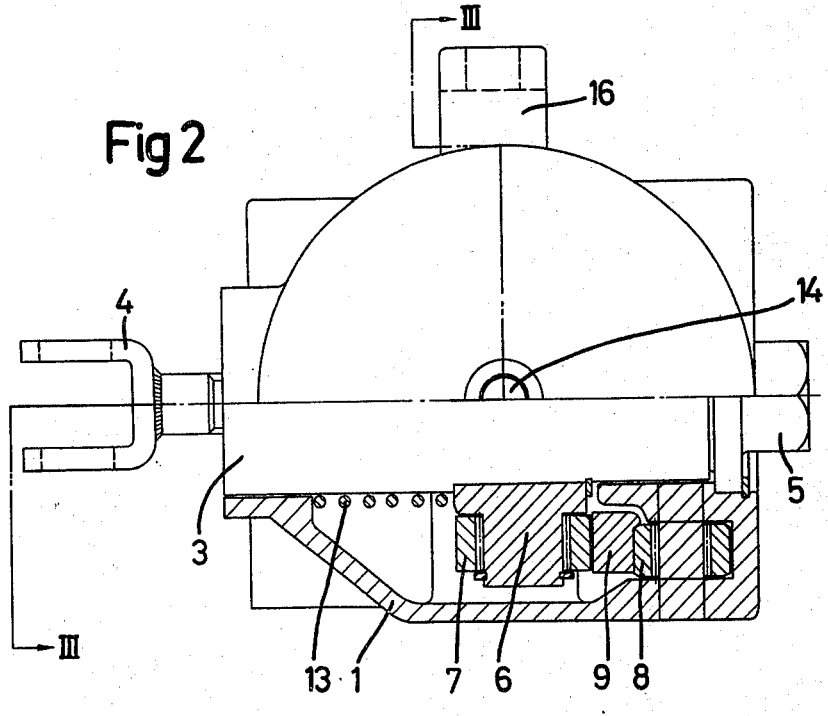
Figure 3:
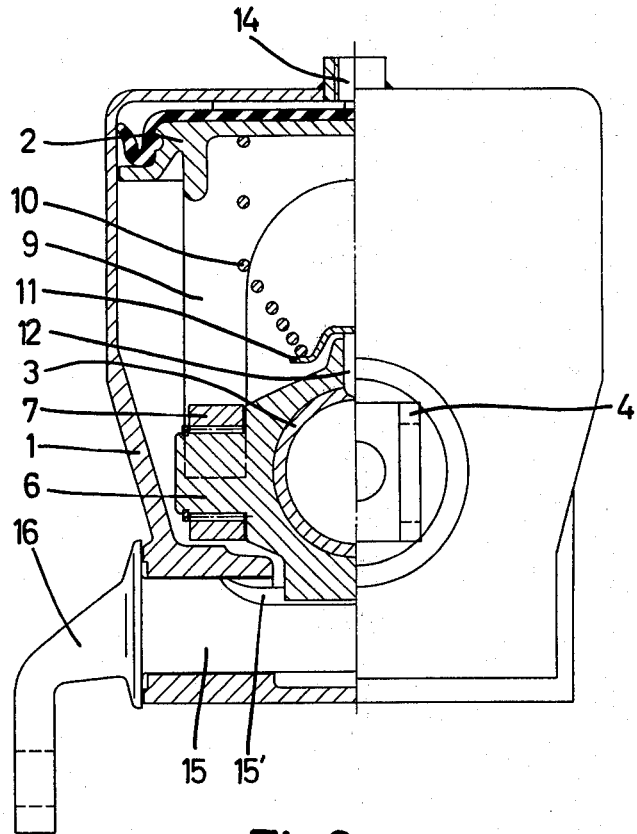

A preferred embodiment of the invention shall be described in further detail below, reference being made to the accompanying drawings, in which FIG. 1 is a cross-sectional view of a brake unit according to the invention, FIG. 2 is a partly sectional view substantially along the line II—II in FIG. 1, and FIG. 3 is a partly sectional view substantially along the line III—III in FIG. 2.

In a common house 1, whose upper part is formed as a cylinder, a fluid pressure actuated piston 2 and a push rod 3 are axially movably arranged in planes substantially perpendicular to each other. The push rod 3 preferably contains a suitable brake adjuster of any kind and is outside the house 1 provided with a yoke 4 for connection to further parts of a vehicle brake rigging (not shown). A nut 5 is provided at the side of the house opposite the yoke 4 and is so connected to parts of the brake adjuster in the push rod that by rotating this nut 5 it will be possible to actuate the brake adjuster, for example at the replacement of worn-out brake blocks or pads.

A driver sleeve 6 is so arranged on the push rod 3 that forces may be transmitted from the sleeve to the push rod in the axial direction. At each side of the driver sleeve 6 a working roller 7 is rotatablly journalled, and a corresponding reaction roller 8 is rotatably journalled in the house 1 at each side of the push rod 3.

To the piston 2 is attached a fork-shaped wedge element 9 placed astraddle of the push rod 3 and the driver sleeve 6, so that each of its legs will extend down between the working roller 7 and the reaction roller 8. Each leg has a reaction surface 9' in the axial direction of the piston 2 and cooperating with the reaction roller 8, as well as a working surface 9'' inclined in relation to the former surface and cooperating with the working roller 7.

A piston return spring 10 (of the helical compression type) is arranged between the piston 2 and a spring support 11 on the driver sleeve 6. The spring support 11 has a pin 12 (FIG. 3) extending through the sleeve 6 and into the push rod 3 with a rounded end therein, so that the rotational connection between these two parts may be removed at the manual turning of the push rod by means of the nut 5.

A push rod return spring 13 (likewise of the helical compression type) is as shown arranged between the house 1 and the driver sleeve 6.

It is evident that at the admission of fluid pressure through an inlet 14 therefor the piston 2 will be pushed down and the push rod 3 moved to the left in the Figures due to the cooperation between the wedge element 9 and the rollers 7 and 8. At decreasing fluid pressure the different parts will return to their shown positions under the influence of the two return springs 10 and 13.

The described brake unit, which is to be attached to suitable parts of a vehicle underframe, is provided with a hand brake or parking brake connection: The driver sleeve 6 has a shoulder 6', whereas a shaft 15 rotatably mounted in the house 1 is provided with a head 15'. When the shaft 15 is turned counter-clockwise in FIG. 1 by means of a lever 16 the head 15' will move the driver sleeve 6 and thus the push rod 3 to the left without affecting the wedge arrangement.

It is evident that modifications are possible within the scope of the appended claims. It is for example possible to have different inclination angles along the working surfaces of the wedge element in order to obtain a certain output characteristic. Also, the geometrical configuration of the wedge element and the mutual arrangement of the rollers may be varied.

What is claimed is:

1. A fluid pressure actuated brake unit for a vehicle brake system, comprising in combination, a housing, a cylinder within said housing, a fluid operated piston axially movable in said cylinder, a brake actuating push rod axially movable substantially perpendicular to the axial direction of the piston, a fork-shaped wedge element attached to the piston and including two legs placed astraddle of the push rod for force-transmission from the piston to the push rod, each leg of the wedge element constituting a body disposed to move axially with said piston and presenting two opposite surfaces comprising a substantially planar reaction surface disposed in a movement plane substantially parallel to the axial movement direction of the piston and a substantially planar working surface inclined from said plane parallel to the axial movement direction of said piston and oriented to provide said force transmission to said push rod in said substantially perpendicular direction, a working roller rotatably attached to each side of the push rod for registration and contact with the respective working surface of each said wedge element, and a pair of reaction rollers rotatably attached to the housing of the unit for respective registration and contact with each of the reaction surfaces of said wedge element without movement of either said working or reaction rollers in said axial movement direction, whereby each wedge leg is disposed for movement by said piston to present said surfaces between one said roller attached to the push rod and one said roller attached to the housing.

2. A brake unit according to claim 1, characterised in that the two working rollers are rotatably journalled on a driver sleeve attached to the push rod and movable therewith.

3. A brake unit according to claim 2, characterised in that a piston return spring is arranged between the piston and the driver sleeve.

4. A brake unit according to claim 3, characterised in that the spring has a support which is mounted by a pin extending through the driver sleeve and into the push rod.

5. A brake unit according to claim 2, characterised in that the driver sleeve is provided with a shoulder and an actuable head registering with said shoulder to move said push rod.

6. A brake unit according to claim 5, characterised in that the head is arranged on an externally rotatable shaft.

* * * * *